(12) United States Patent
Chang

(10) Patent No.: US 9,645,685 B2
(45) Date of Patent: May 9, 2017

(54) FLEXIBLE TOUCH PANEL

(71) Applicant: Shenzhen China Star Optoelectronics Technology Co., Ltd., Shenzhen, Guangdong (CN)

(72) Inventor: Chun-kai Chang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 197 days.

(21) Appl. No.: 14/426,370

(22) PCT Filed: Dec. 30, 2014

(86) PCT No.: PCT/CN2014/095572
§ 371 (c)(1),
(2) Date: Mar. 5, 2015

(87) PCT Pub. No.: WO2016/101310
PCT Pub. Date: Jun. 30, 2016

(65) Prior Publication Data
US 2016/0342235 A1  Nov. 24, 2016

(30) Foreign Application Priority Data
Dec. 24, 2014  (CN) .......................... 2014 1 0817415

(51) Int. Cl.
*G06F 3/044*  (2006.01)
*G06F 3/041*  (2006.01)

(52) U.S. Cl.
CPC ............ *G06F 3/044* (2013.01); *G06F 3/0416* (2013.01); *G06F 2203/04102* (2013.01)

(58) Field of Classification Search
CPC .................. G06F 3/044; G06F 3/0416; G06F 2203/04102
USPC ................................................... 345/173, 174
See application file for complete search history.

(56) References Cited

U.S. PATENT DOCUMENTS

| | | | | |
|---|---|---|---|---|
| 5,436,565 A | * | 7/1995 | Gammell | G01N 27/221 324/679 |
| 2013/0321004 A1 | * | 12/2013 | Chen | G01R 1/06 324/663 |
| 2015/0153942 A1 | * | 6/2015 | Kim | G06F 3/0414 715/846 |
| 2015/0153951 A1 | * | 6/2015 | Kim | G06F 3/0414 715/773 |

* cited by examiner

*Primary Examiner* — Dmitriy Bolotin
(74) *Attorney, Agent, or Firm* — Andrew C. Cheng

(57) ABSTRACT

A flexible touch panel is disclosed. The flexible touch panel includes a plurality of driving electrode patterns and detection electrode patterns. A distance between the driving electrode patterns and detection electrode patterns is configured such that a difference of mutual capacitance between the driving electrode pattern and detection electrode pattern in different areas of the flexible touch panel has been changed in an opposite direction when the flexible touch panel has been curved. The difference of the mutual capacitance is the difference of the mutual capacitance before a touch event and after the touch event. In this way, the difference of the mutual capacitance caused by curved flexible touch panel may be decreased.

8 Claims, 3 Drawing Sheets

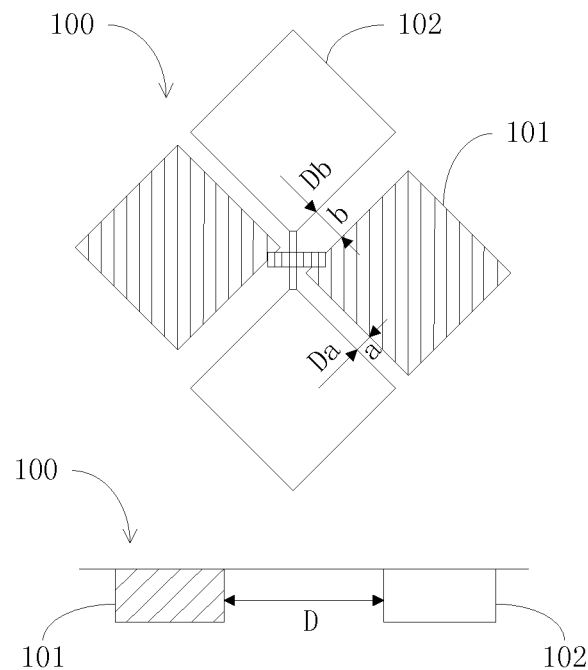
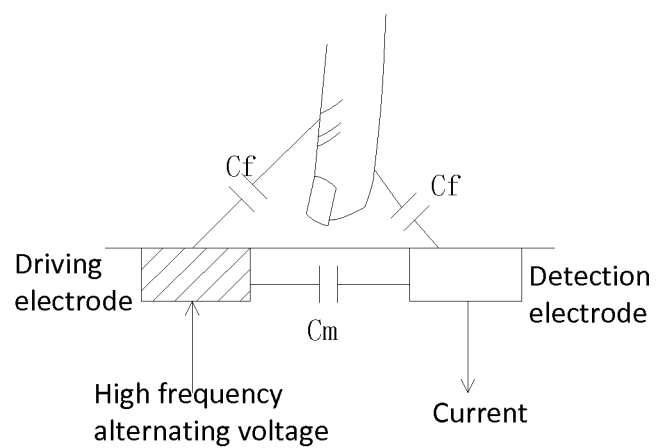
FIG. 1
FIG. 2

FLEXIBLE TOUCH PANEL

BACKGROUND OF THE INVENTION

1. Field of the Invention

The present disclosure relates to touch panel technology, and more particularly to a flexible touch panel.

2. Discussion of the Related Art

Adopting touch panels to be input devices of electronic device has been a newly developed trend. Generally, touch panels may include resistive type and capacitive type. The capacitive touch panels are more popular as being capable of implementing multiple touches, which mainly relates to detecting sensing current of human body. The sensing capacitive touch panels includes a plurality of horizontal and vertical electrodes. When fingers have touched the touch panel, the capacitance between the electrodes may change, which may be utilized to determine the coordinate of the touch points.

Currently, most of the touch panels are inflexible flat panel. In order to satisfy the consumers' demand, vendors are motivated to develop inflexible flat panels. The panels are curved, and adopt capacitive principles to determine the coordinate of touch points. However, the degree of curvature in different locations of the flexible touch panels are different, which may result in a great variance in capacitance. As such, the touch panel is not capable of precisely determining the coordinates due to the variance.

SUMMARY

According to the present disclosure, the flexible touch panel may decrease the difference of mutual capacitance caused by the curved flexible touch panel.

In one aspect, a flexible touch panel includes: a plurality of driving electrode patterns and detection electrode patterns, a distance between the driving electrode patterns and detection electrode patterns is configured such that a difference of mutual capacitance between the driving electrode pattern and detection electrode pattern in different areas of the flexible touch panel has been changed in an opposite direction when the flexible touch panel has been curved, wherein the difference of the mutual capacitance is the difference of the mutual capacitance before an touch event and after the touch event.

Wherein a distance between the driving electrode pattern and a portion of the detection electrode pattern is configured to be smaller than a predetermined distance, and the distance between the driving electrode pattern and the other portion of the detection electrode pattern is configured to be larger than the predetermined distance, the predetermined distance is a corresponding distance of a maximum difference of the mutual capacitance of a changing curve showing a relationship between the mutual capacitance difference and the distance between the driving electrode pattern and the detection electrode pattern.

Wherein the driving electrode pattern and the detection electrode pattern are interleaved with each other, one driving electrode pattern is adjacent to at least two detection electrode patterns, wherein the distance between the driving electrode pattern and a portion of the detection electrode pattern is configured to be smaller than the predetermined distance, and the distance between the driving electrode pattern and the other portion of the detection electrode pattern is configured to be larger than the predetermined distance.

Wherein the detection electrode patterns are diamond-shaped, and edges of the driving electrode patterns and the detection electrode patterns are parallel to each other.

Wherein one of the driving electrode pattern and the detection electrode pattern is a polygon electrode pattern, and the other one of the driving electrode pattern and the detection electrode pattern is a circular arc electrode pattern, the circular arc electrode pattern is configured to surround the polygon electrode pattern, a distance between vertexes of the polygon electrode patterns and the circular arc electrode patterns is smaller than a predetermined distance, and a distance between a central point of the edges of the polygon electrode patterns and the circular arc electrode patterns is configured to be larger than the predetermined distance.

Wherein the polygon electrode patterns and the circular arc electrode patterns are concentric.

In another aspect, a flexible touch panel includes: a plurality of driving electrode patterns and detection electrode patterns, the driving electrode pattern and the detection electrode pattern are interleaved with each other, one driving electrode pattern is adjacent to at least two detection electrode patterns, and wherein a distance between the driving electrode pattern and a portion of the detection electrode pattern is configured to be different with the distance between the driving electrode pattern and the other portion of the detection electrode pattern.

Wherein the distance between the driving electrode pattern and a portion of the detection electrode pattern is configured to be smaller than a predetermined distance, and the distance between the driving electrode pattern and the other portion of the detection electrode pattern is configured to be larger than the predetermined distance, the predetermined distance is a corresponding distance of a maximum difference of mutual capacitance of a changing curve showing a relationship between a mutual capacitance difference and the distance between the driving electrode pattern and the detection electrode pattern, and wherein the difference of the mutual capacitance is the difference of the mutual capacitance before an touch event and after the touch event.

In another aspect, a flexible touch panel includes: a plurality of driving electrode patterns and detection electrode patterns, wherein one of the driving electrode pattern and the detection electrode pattern is a polygon electrode pattern, and the other one of the driving electrode pattern and the detection electrode pattern is a circular arc electrode pattern, the circular arc electrode pattern is configured to surround the polygon electrode pattern, and wherein the polygon electrode patterns and the circular arc electrode patterns are concentric.

Wherein a distance between vertexes of the polygon electrode patterns and the circular arc electrode patterns is smaller than a predetermined distance, and a distance between a central point of the edges of the polygon electrode patterns and the circular arc electrode patterns is configured to be larger than the predetermined distance, the predetermined distance is a corresponding distance of a maximum difference of mutual capacitance of a changing curve showing a relationship between a mutual capacitance difference and the distance between the driving electrode pattern and the detection electrode pattern, and wherein the difference of the mutual capacitance is the difference of the mutual capacitance before an touch event and after the touch event.

In view of the above, the flexible touch panel includes a plurality of driving electrode patterns and detection electrode patterns. When there is no touch event, the mutual capacitance (Cm) exists between the driving electrode patterns and detection electrode patterns. When the flexible touch panel has been touched, another mutual capacitance is generated, which results in the difference of the mutual capacitance. When the flexible touch panel has been curved, the distance between the driving electrode patterns and detection electrode patterns changes relative to the curvature, which causes a variance of the difference of the mutual capacitance. The locations of the touch event may not be precisely determined due to the variance. Thus, the distance between the driving electrode patterns and detection electrode patterns may be configured such that the difference of the mutual capacitance between the driving electrode patterns and detection electrode patterns in different areas of the flexible touch panel may change in the opposite direction when the flexible touch panel has been curved. In this way, the difference of the mutual capacitance has been decreased, and so does the variance of the mutual capacitance.

BRIEF DESCRIPTION OF THE DRAWINGS

FIG. 1 is a schematic view of the flexible touch panel in accordance with a first embodiment.

FIG. 2 is a schematic view showing how the touch is detected by the difference of the mutual capacitance of the flexible touch panel in accordance with one embodiment.

DETAILED DESCRIPTION OF THE EMBODIMENTS

Embodiments of the invention will now be described more fully hereinafter with reference to the accompanying drawings, in which embodiments of the invention are shown.

FIG. 1 is a schematic view of the flexible touch panel in accordance with a first embodiment. The flexible touch panel 100 may include a plurality of driving electrode patterns 101 and a plurality of detection electrode pattern 102. The distance between the driving electrode pattern 101 and the detection electrode pattern 102 is represented by "D."

The flexible touch panel 100 is a mutual capacitance touch panel. The mutual capacitance difference ($\Delta$Cm) between the driving electrode pattern 101 and the detection electrode pattern 102 may be utilized to determine whether the corresponding location of the flexible touch panel 100 has been touched. FIG. 2 is a schematic view showing how the touch is detected by the difference of the mutual capacitance of the flexible touch panel in accordance with one embodiment. As shown, the mutual capacitance (Cm) is formed between the driving electrode pattern and the detection electrode pattern when the touch panel has been touched. Fingers operate as the conductive material and form an external capacitance (Cf) with the electrode. The external capacitance (Cf) and the mutual capacitance (Cm) form a parallel connected circuit, which changes a volume of the mutual capacitance (Cm) and obtains a new mutual capacitance (Cm1). The difference of the mutual capacitance ($\Delta$Cm) equals to Cm minus Cm1, wherein the Cm1 changes in the same direction with the Cm and the Cm1 changes in different direction with the Cf. Upon detecting the difference of the mutual capacitance ($\Delta$Cm) of one electrode, it may be determined that the corresponding location of the electrode of the touch panel has been touched.

In order to detect the difference of the mutual capacitance ($\Delta$Cm), the driving patterns have been applied with a high frequency alternative voltage and the current of the detection electrode has been detected. The high frequency alternative voltage results in that electrical field energy has been generated between the driving electrode and the detection electrode. When the touch panel has been touched, a portion of the electrical field energy may flow to the fingers such that the electrical field energy flows from the driving electrode to the detection electrode has been decreased, and so does the current of the detection electrode. Thus, the current of the detection electrode may be utilized to determine whether the difference of the mutual capacitance ($\Delta$Cm) exists.

Figure 3:
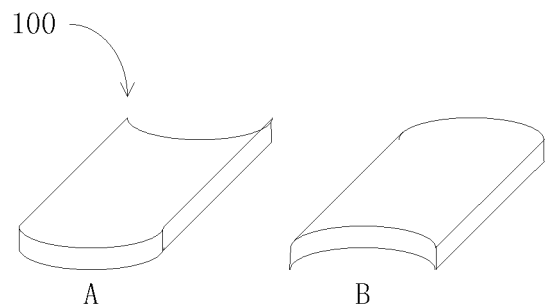
FIG. 3 is a schematic view showing the outline of the flexible touch panel after being curved.
Figure 4:
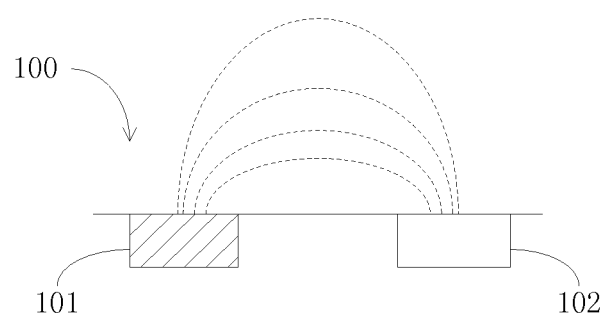
FIG. 4 is a schematic view of the electrical field formed before the flexible touch panel of FIG. 3 has been curved.
Figure 5:
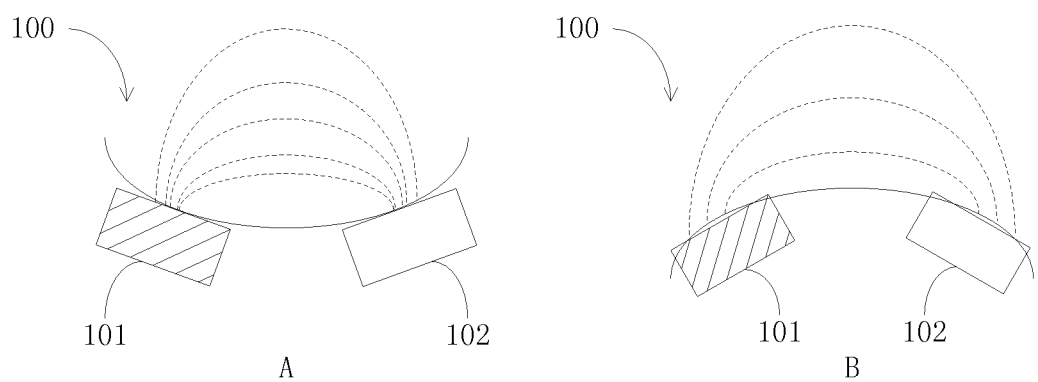
FIG. 5 is a schematic view of the electrical field of the curved flexible touch panel of FIG. 3.

FIG. 3 is a schematic view showing the outline of the flexible touch panel after being curved, wherein two curved types are shown. It can be understood that the electrical field between the driving electrode pattern 101 and the detection electrode pattern 102 and the mutual capacitance (Cm) may change after the flexible touch panel 100 has been curved. FIG. 4 is a schematic view of the electrical field formed before the flexible touch panel of FIG. 3 has been curved. FIG. 5 is a schematic view of the electrical field of the curved flexible touch panel of FIG. 3.

As shown in FIG. 4, the electrical field between the driving electrode pattern 101 and the detection electrode pattern 102 have the mutual capacitance (Cm) before the flexible touch panel 100 has been touched. After the flexible touch panel 100 has been touched, the external capacitance (Cf) is formed between the finger and the two electrode patterns. At this moment, the new mutual capacitance (Cm1) is generated. Thus, the difference of the mutual capacitance ($\Delta$Cm)=Cm−Cm1. As shown in FIG. 5, the flexible touch panel 100 is curved and the flexible touch panel 100 has outline as shown in FIG. 3. With respect to the "A" portion of FIG. 5, surfaces of the driving electrode pattern 101 and the detection electrode pattern 102 facing toward the finger get closer to each other. Comparing to the scenario when the flexible touch panel 100 has not been curved, the distance (D) between the driving electrode pattern 101 and the detection electrode pattern 102 has been decreased. At this moment, the density of the electrical field between the two electrode patterns is larger, and the mutual capacitance (Cm) has been increased. After the flexible touch panel 100 has been touched, the distance (D) between the two electrode patterns has been decreased, which results in a larger external capacitance (Cf). As Cm1 changes in the same direction with the Cm and Cm1 changes in the opposite direction with the Cf. That is, Cm1 increases when Cm increases, and Cm1 decreases when Cf increases. Thus, in view of $\Delta$Cm=Cm−Cm1, it is unable to determine whether $\Delta$Cm is increased or decreased when the distance (D) decreases.

With respect to the "B" portion of FIG. 5, when the flexible touch panel 100 has not been touched, the distance between the surfaces of the driving electrode pattern 101 and the detection electrode pattern 102 facing toward the finger is substantially the same. That is, when the liquid crystal device 100 has not been curved, the distance (D) between the driving electrode pattern 101 and the detection electrode pattern 102 increases. At this moment, the density of the electrical field between the two electrode patterns is smaller, and the mutual capacitance (Cm) decreases. When the liquid crystal device 100 has been touched, the distance between the two electrode patterns is larger, and the external capacitance (Cf) decreases. Similarly, it is unable to determine whether ΔCm is increased or decreased when the distance (D) is increased.

Figure 6:
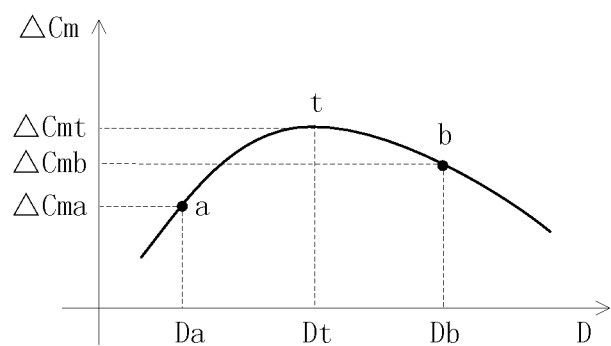
FIG. 6 is a schematic view showing the relationship of the mutual capacitance difference and the distance between driving electrode pattern and the detection electrode pattern in accordance with one embodiment.

Thus, the relationship between the difference of the mutual capacitance (ΔCm) and the distance (D) has been simulated by calculating corresponding ΔCm using a plurality of values (D). When the D increases, the ΔCm increases first and then decreases. FIG. 6 is a schematic view showing the relationship of the mutual capacitance difference and the distance between driving electrode pattern and the detection electrode pattern in accordance with one embodiment. The threshold point t (Dt, ΔCmt) in FIG. 6 relates to a maximum difference of the mutual capacitance (ΔCmt) when the distance between the driving electrode and the detection electrode is the predetermined distance (Dt). When the distance (D) is smaller than Dt, the difference of the mutual capacitance (ΔCm) increases together with the D. When the distance (D) is smaller than t, difference of the mutual capacitance (ΔCm) decreases when the distance (D) increases.

It can be understood that when the flexible touch panel 100 has been curved, the distance (D) between the driving electrode pattern 101 and the detection electrode pattern 102 may be increased or decreased. Correspondingly, the difference of the mutual capacitance (ΔCm) may increase or decrease so as to cause a larger variance. When the flexible touch panel 100 has been touched, the difference of the mutual capacitance (ΔCm) may not be detected when the variance is larger, which may the touch function fail.

Thus, the distance between the driving electrode pattern 101 and the detection electrode pattern 102 may be configured in accordance with the relationship of the ΔCm and the distance (D). As such, the difference of the mutual capacitance (ΔCm) in different areas may be changed in the opposite direction, which contributes to the smaller variance of the flexible touch panel 100.

Also referring to FIGS. 1 and 6, within the area "a" of FIG. 1, the distance (Da) between the driving electrode pattern 101 and the detection electrode pattern 102 within the area "a" is configured to be smaller than the predetermined distance (Dt). In addition, the distance (Db) between the driving electrode pattern 101 and the detection electrode pattern 102 within the area "b" is configured to be larger than the predetermined distance (Dt). When the Da and the Db increase or decrease due to the curvature, the ΔCma corresponding to the Da increases or decreases and the ΔCmb corresponding to the Db decreases or increases. Namely, the ΔCma changes in the opposite direction with the ΔCmb. Thus, when the flexible touch panel 100 has been curved, the mutual capacitance between the driving electrode pattern 101 and the detection electrode pattern 102 within different areas changes in opposite direction.

In real scenario, the driving electrode pattern 101 and the detection electrode pattern 102 may be diamond-shaped, square-shaped, or rectangle-shaped in terms of the space, manufacturing process, and touch sensibility. In addition, the edges of the driving electrode pattern 101 and the detection electrode pattern 102 are parallel to each other. The driving electrode pattern 101 and the detection electrode pattern 102 are arranged to be interleaved with each other. One driving electrode pattern 101 is adjacent to at least two detection electrode patterns 102. In addition, a distance between the driving electrode pattern 101 and a portion of the detection electrode pattern 102 is configured to be smaller than a predetermined distance (Dt), and the distance between the driving electrode pattern 101 and the other portion of the detection electrode pattern 102 is configured to be larger than the predetermined distance (Dt).

Figure 7:
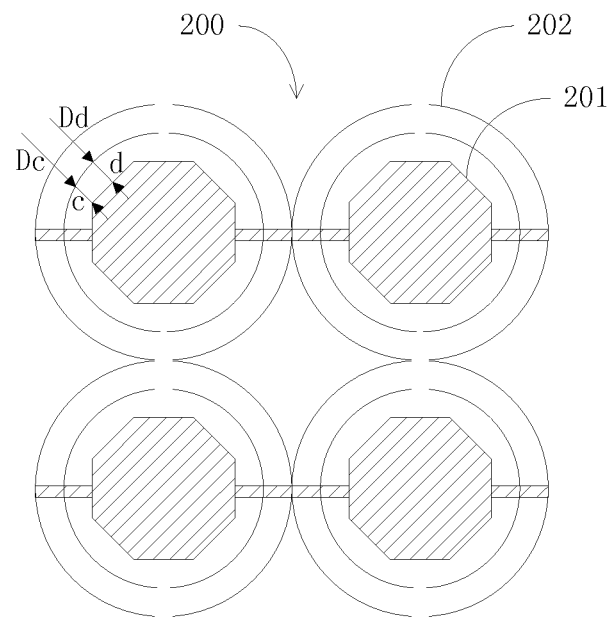
FIG. 7 is a schematic view of the flexible touch panel in accordance with a second embodiment.

FIG. 7 is a schematic view of the flexible touch panel in accordance with a second embodiment. The flexible touch panel 200 includes a plurality of driving electrode pattern 201 and a plurality of detection electrode patterns 202. The driving electrode pattern 201 is a polygon electrode pattern. The detection electrode pattern 202 is a circular arc electrode pattern. The detection electrode pattern 202 is configured to surround the driving electrode pattern 201. It can be understood that the distance between the edges of the polygon and the circular arc may have slight difference within this configuration.

Similarly, the flexible touch panel 200 includes a "c" area wherein the distance (Dc) between the driving electrode pattern 201 and the adjacent detection electrode pattern 202 is smaller than the predetermined distance (Dt). In addition, the distance (Dd) between the driving electrode pattern 201 and the adjacent detection electrode pattern 202 is larger than the predetermined distance (Dt). In the embodiment, as the distance between the edge of the driving electrode pattern 201 and the detection electrode pattern 202 may slightly change, the In the embodiment, as the distance between edges of the driving electrode pattern 201 and the circular arc of the detection electrode pattern 202 changes gradually, the distance (Dc) between vertexes of the polygon electrode patterns and the circular arc electrode patterns is configured to be smaller than the predetermined distance (Dt). A distance between a central point of the edges of the polygon patterns and the circular arc electrode patterns is configured to be larger than the predetermined distance (Dt). Similarly, when the flexible touch panel 200 has been curved, Dc and Dd increase at the same time. As such, the corresponding ΔCmc of Dc increases (decreases), and the corresponding ΔCmc of Dd decreases (increases). ΔCmc may change in an opposite direction relative to the ΔCmd. As the changed amount offsets with each other, the overall ΔCm of the flexible touch panel 200 is decreased.

In order to ensure the uniformity and the stability of the flexible touch panel 200, the polygon electrode pattern may be an octagon. The circular electrode pattern may be a circle. In addition, the octagon and the circle are concentric.

In other embodiments, the driving electrode pattern 201 may be the circular electrode patterns. The detection electrode pattern 202 may be the polygon electrode patterns. In other embodiments, the polygon may be a triangle, quadrangle, or even 12-gon. It can also be understood that the distance may be difficult to be configured when the edges of the polygon increases.

In view of the above, the flexible touch panel includes a plurality of driving electrode patterns and detection electrode patterns. When there is no touch events, the mutual capacitance (Cm) exists between the driving electrode patterns and detection electrode patterns. When the flexible touch panel has been touched, another mutual capacitance is generated, which results in the difference of the mutual capacitance. When the flexible touch panel has been curved, the distance between the driving electrode patterns and detection electrode patterns changes relative to the curvature, which causes a variance of the difference of the mutual capacitance. The locations of the touch event may not be precisely determined due to the variance. Thus, the distance between the driving electrode patterns and detection electrode patterns may be configured such that the difference of the mutual capacitance between the driving electrode patterns and detection electrode patterns in different areas of the flexible touch panel may change in the opposite direction when the flexible touch panel has been curved. In this way, the difference of the mutual capacitance has been decreased, and so does the variance of the mutual capacitance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flexible touch panel, comprising:
a plurality of driving electrode patterns and detection electrode patterns, wherein a distance between the driving electrode patterns and detection electrode patterns is configured such that when the flexible touch panel is curved, a difference of mutual capacitance between the driving electrode pattern and detection electrode pattern in a first one of areas of the flexible touch panel is increased, while a difference of mutual capacitance between the driving electrode pattern and detection electrode pattern in a second one of the areas of the flexible touch panel that is different from the first one of the areas of the flexible touch panel is decreased, wherein the difference of the mutual capacitance is the difference of the mutual capacitance before an touch event and after the touch event.

2. The touch panel as claimed in claim 1, wherein a distance between the driving electrode pattern and a portion of the detection electrode pattern is configured to be smaller than a predetermined distance, and the distance between the driving electrode pattern and the other portion of the detection electrode pattern is configured to be larger than the predetermined distance, the predetermined distance is a corresponding distance of a maximum difference of the mutual capacitance of a changing curve showing a relationship between the mutual capacitance difference and the distance between the driving electrode pattern and the detection electrode pattern.

3. The touch panel as claimed in claim 2, wherein the driving electrode pattern and the detection electrode pattern are interleaved with each other, one driving electrode pattern is adjacent to at least two detection electrode patterns, wherein the distance between the driving electrode pattern and a portion of the detection electrode pattern is configured to be smaller than the predetermined distance, and the distance between the driving electrode pattern and the other portion of the detection electrode pattern is configured to be larger than the predetermined distance.

4. The touch panel as claimed in claim 3, wherein the detection electrode patterns are diamond-shaped, and edges of the driving electrode patterns and the detection electrode patterns are parallel to each other.

5. The touch panel as claimed in claim 2, wherein one of the driving electrode pattern and the detection electrode pattern is a polygon electrode pattern, and the other one of the driving electrode pattern and the detection electrode pattern is a circular arc electrode pattern, the circular arc electrode pattern is configured to surround the polygon electrode pattern, a distance between vertexes of the polygon electrode patterns and the circular arc electrode patterns is smaller than a predetermined distance, and a distance between a central point of the edges of the polygon electrode patterns and the circular arc electrode patterns is configured to be larger than the predetermined distance.

6. The touch panel as claimed in claim 5, wherein the polygon electrode patterns and the circular arc electrode patterns are concentric.

7. A flexible touch panel, comprising:
a plurality of driving electrode patterns and detection electrode patterns, the driving electrode pattern and the detection electrode pattern are interleaved with each other, one driving electrode pattern is adjacent to at least two detection electrode patterns, wherein a distance between the driving electrode pattern and a portion of the detection electrode pattern is configured to be different with the distance between the driving electrode pattern and the other portion of the detection electrode pattern;
wherein the distance between the driving electrode pattern and a portion of the detection electrode pattern is configured to be smaller than a predetermined distance, and the distance between the driving electrode pattern and the other portion of the detection electrode pattern is configured to be larger than the predetermined distance, the predetermined distance is a corresponding distance of a maximum difference of mutual capacitance of a changing curve showing a relationship between a mutual capacitance difference and the distance between the driving electrode pattern and the detection electrode pattern, and wherein the difference of the mutual capacitance is the difference of the mutual capacitance before an touch event and after the touch event.

8. A flexible touch panel, comprising:
a plurality of driving electrode patterns and detection electrode patterns, wherein one of the driving electrode pattern and the detection electrode pattern is a polygon electrode pattern, and the other one of the driving electrode pattern and the detection electrode pattern is a circular arc electrode pattern, the circular arc electrode pattern is configured to surround the polygon electrode pattern, and wherein the polygon electrode patterns and the circular arc electrode patterns are concentric;
wherein a distance between vertexes of the polygon electrode patterns and the circular arc electrode patterns is smaller than a predetermined distance, and a distance between a central point of the edges of the polygon electrode patterns and the circular arc electrode patterns is configured to be larger than the predetermined distance, the predetermined distance is a corresponding distance of a maximum difference of mutual capacitance of a changing curve showing a relationship between a mutual capacitance difference and the distance between the driving electrode pattern and the detection electrode pattern, and wherein the difference of the mutual capacitance is the difference of the mutual capacitance before an touch event and after the touch event.

* * * * *